(12) United States Patent
Windolf et al.

(10) Patent No.: US 11,851,145 B2
(45) Date of Patent: Dec. 26, 2023

(54) SHIP WITH A BOW FENDER

(71) Applicant: Ørsted Wind Power A/S, Fredericia (DK)

(72) Inventors: Mikkel Haugaard Windolf, Gentofte (DK); Poul Hagelskjær Vestergaard, Gentofte (DK)

(73) Assignee: Ørsted Wind Power A/S

( * ) Notice: Subject to any disclaimer, the term of this patent is extended or adjusted under 35 U.S.C. 154(b) by 234 days.

(21) Appl. No.: 17/289,175

(22) PCT Filed: Oct. 24, 2019

(86) PCT No.: PCT/EP2019/079057
§ 371 (c)(1),
(2) Date: Apr. 27, 2021

(87) PCT Pub. No.: WO2020/089034
PCT Pub. Date: May 7, 2020

(65) Prior Publication Data
US 2021/0394876 A1 Dec. 23, 2021

(30) Foreign Application Priority Data
Oct. 29, 2018 (EP) .................................... 18203179

(51) Int. Cl.
*B63B 5/02* (2006.01)
*B63B 21/00* (2006.01)
*B63B 27/30* (2006.01)
*B63B 59/02* (2006.01)

(52) U.S. Cl.
CPC .............. *B63B 59/02* (2013.01); *B63B 21/00* (2013.01); *B63B 27/30* (2013.01)

(58) Field of Classification Search
CPC ......... B63B 59/00; B63B 59/02; B63B 21/00; B63B 21/02; B63B 27/00; B63B 27/30
USPC ........................................................ 114/219
See application file for complete search history.

(56) References Cited

U.S. PATENT DOCUMENTS

| 4,267,792 A | 5/1981 | Kimura et al. |
| 9,061,744 B2 | 6/2015 | Awashima et al. |
| 11,091,236 B2 * | 8/2021 | Olofsson ................. B63B 59/02 |
| 2007/0000424 A1 | 1/2007 | Clarkson et al. |
| 2007/0199500 A1 | 8/2007 | Jakobsson |

FOREIGN PATENT DOCUMENTS

| EP | 1695902 A2 | 8/2006 |
| EP | 1740446 B1 | 1/2011 |
| EP | 3190042 A1 | 7/2017 |
| GB | 2473490 A | 3/2011 |
| GB | 2485861 A | 5/2012 |

(Continued)

*Primary Examiner* — Lars A Olson
(74) *Attorney, Agent, or Firm* — Condo Roccia Koptiw LLP

(57) ABSTRACT

Described are ships and docking systems comprising a fender for mounting on a bow of a ship, comprising an elastically deformable body portion, and a concave engagement surface defined by the body portion, wherein the concave engagement surface extends perpendicular to a center line of the ship, such that portions of the fender distal to the center line extend further forward in a direction parallel to the center line than a portion of the fender central to the center line.

16 Claims, 3 Drawing Sheets

(56) References Cited

FOREIGN PATENT DOCUMENTS

| GB | 2489679 A | 10/2012 |
| GB | 2520094 A | 5/2015 |
| JP | S-61130513 A | 6/1986 |
| JP | 2012-025272 A | 2/2012 |
| JP | 2013-083070 A | 5/2013 |
| KR | 10-2013-0000591 A | 1/2013 |

\* cited by examiner

SHIP WITH A BOW FENDER

CROSS REFERENCE TO RELATED APPLICATIONS

This application is the National Stage Entry under 35 U.S.C. § 371 of Patent Cooperation Treaty Application No. PCT/EP2019/079057, filed 24 Oct. 2019, which claims priority from EP Application No. 18203179.9, filed 29 Oct. 2018, the contents of each of which are hereby incorporated by reference herein in their entireties.

TECHNICAL FIELD

The present invention relates to the docking of ships, in particular transfer vessels, against structures, such as but not exclusively offshore structures, including monopiles of wind farm equipment.

BACKGROUND

When operating offshore wind farms, it is necessary to transport service personnel and equipment etc. to the wind farm for service, maintenance and the like. This is normally done via the sea using transfer vessels. These transfer vessels need to be able to dock at the various different types of equipment such as platforms, wind turbine foundations or other vessels.

For the docking purposes the vessel is normally pressed against a suitable landing structure of the equipment under its own engine power. For wind turbines located on monopiles the landing structure is normally a pair of vertical protective columns arranged with a suitable spacing to the monopile, thereby inter alia protecting the monopile from scratching or denting, the latter potentially compromising the structural integrity of the monopile.

Examples of such protective columns, protecting a monopile wind turbine foundation, may inter alia be found in the published patent applications GB2473490, GB2520094 and GB2489679.

Providing and maintaining the landing structure on a monopile at sea, however, involves additional costs and there is therefore at least an economic incentive to avoid the use of the landing structure. This, in turn, provides the infrastructural problem that existing transfer vessels, such as those also disclosed in GB2473490, GB2520094 and GB2489679, are specifically adapted to dock at the existing landing structures. This makes them unsuitable for e.g. docking directly at the monopile because there would be an increased risk of scratching, denting, or even compromising the structural integrity of the monopile.

More specifically, GB2520094 has two straight fenders on either side of a wedge shaped cleft adapted specifically to engage the protective column of the conventional landing structure.

GB2489679 discloses the use of two or more, in particular three, convex forward facing fenders, separated by gaps adapted to receive and engage one or both of the protective columns.

Somewhat similarly, GB2473490 discloses a large number of convex forward facing fenders separated by gaps adapted to receive and engage one or both of the protective columns.

Based on this prior art it is a first object of the invention to simplify offshore structures, in particular but not exclusively the monopiles used for foundation of offshore wind turbines.

Based on this prior art it is a second object to provide a ship able to dock at structures lacking protective landing structure, in particular but not exclusively monopiles of wind farm equipment.

Based on this prior art it is a third object to provide a ship which in addition to being able to dock at structures lacking protective landing structure still allows the docking at landing structures in cases where the landing structure is present.

SUMMARY

According to a first aspect of the present invention at least some of these objects are achieved by a ship comprising at least one hull and a bow part defining a forward direction of said ship, where said bow part comprises at least one elastically deformable fender extending at least partially across said bow part with a given curvature in the cross-wise direction and having at least one curved engagement surface in said cross-wise direction, where said engagement surface faces in said forward direction and is adapted to engage a structure during docking of the ship at said structure, characterized in that said fender comprises at least one concave engagement surface as seen in the cross-wise direction from said forward direction.

By providing at least one concave engagement surface, the impact and pressure area against the circular parts of the structure, in particular a circular external curvature of a monopile, may be reduced as compared to the point of impact of the prior art convex fenders. It may furthermore allow a large area of frictional engagement securing the lateral and vertical position of the bow with respect to the monopile against waves and currents during transfer of personnel and equipment.

According to a second aspect of the invention, at least one of these objects are achieved by a method for docking a ship, wherein a ship according to the first aspect is pressed against a structure using the engine power of the ship.

According to a third aspect of the invention, the first object is achieved by the use of a monopile without protective columns for the foundation of an offshore wind turbine. By changing the ships and methods for servicing offshore wind turbine generators by the implementation of the first and second aspects of the invention, the costly establishment and maintenance of the protective columns of the landing structure on the monopiles used for off-shore wind turbine generators is avoided.

According to a fourth aspect of the invention at least one of these objects is achieved by a system comprising a monopile and a ship according to the first aspect of the invention.

According to a first preferred embodiment of the first aspect of the invention, the curvature of the concave engagement surface comprises at least one circular sector along the curvature. This allows the curvature to be matched to structures against which the ship frequently docks, in turn maximizing friction and minimizing impact force.

According to a further preferred embodiment of the first aspect of the invention, the circular sector has a radius of more than 1 meter, preferably between 3 and 10 meters, more preferred between 4 and 8 meters, and most preferred between 5 and 7 meters. This makes the ship particularly suitable for monopiles of wind turbines, but also other foundation structures of large dimensions, such as e.g. floating wind turbine foundations.

According to another preferred embodiment of the first aspect of the invention, the centre of the circular sector is located ahead of the ship, preferably straight ahead coinciding with the forward direction of the ship. This facilitates the docking of the ship head on using the ships main engines.

According to a further preferred embodiment of the first aspect of the invention, the ship further comprises at least one plastically deformable member arranged between the elastically deformable fender and the at least one hull. Such plastically deformable member provides the ship with crush zones, in turn protecting the monopile against damaging impacts from the ship. Unlike the monopile, the plastically deformable members may be repaired or replaced at shore, at minute costs as compared to the costs for repairing e.g. an offshore monopile.

According to another preferred embodiment of the first aspect of the invention, the at least one plastically deformable member is located in a recess in the back of the elastically deformable fender as seen in the forward direction. This allows the interchangeable provision of the plastically deformable member close to the potential impact zones of the fender, thus ensuring good protection of the structure, such as a monopile, against which the ship is to dock.

According to a preferred embodiment of the second aspect of the invention, the structure is an offshore structure. Thereby the costly provision and maintenance of landing structures on offshore structures can be avoided. This is particularly advantageous when according to another preferred embodiment of the method, the off-shore structure is a monopile of a wind turbine.

BRIEF DESCRIPTION OF THE DRAWINGS

The invention will now be described in greater detail based on non-limiting exemplary embodiments and with reference to the drawings, on which.

DETAILED DESCRIPTION

Figure 1:
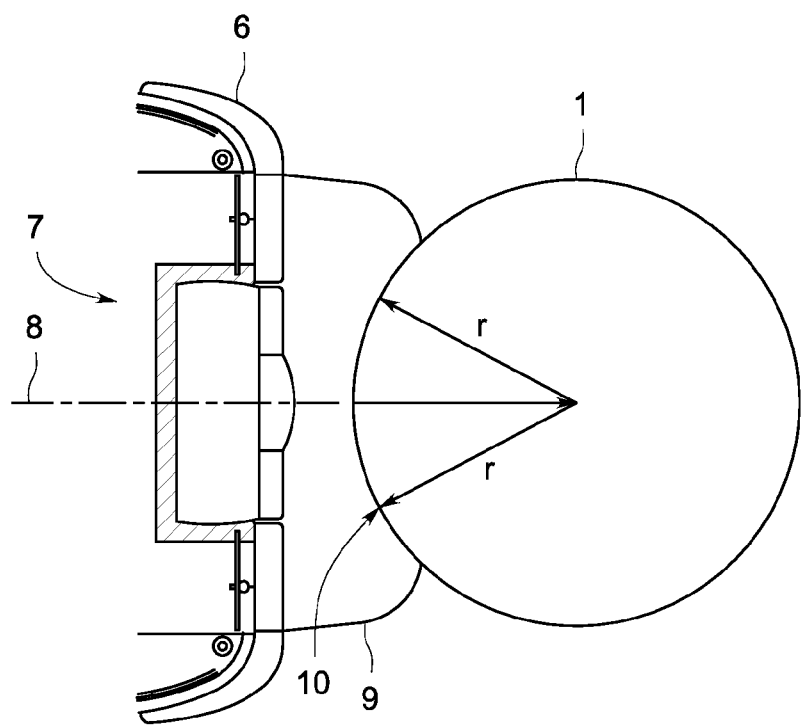
FIG. 1 is a schematic top view of the bow of a ship with a single fender according to the invention docked directly at a monopile structure.
Figure 4:
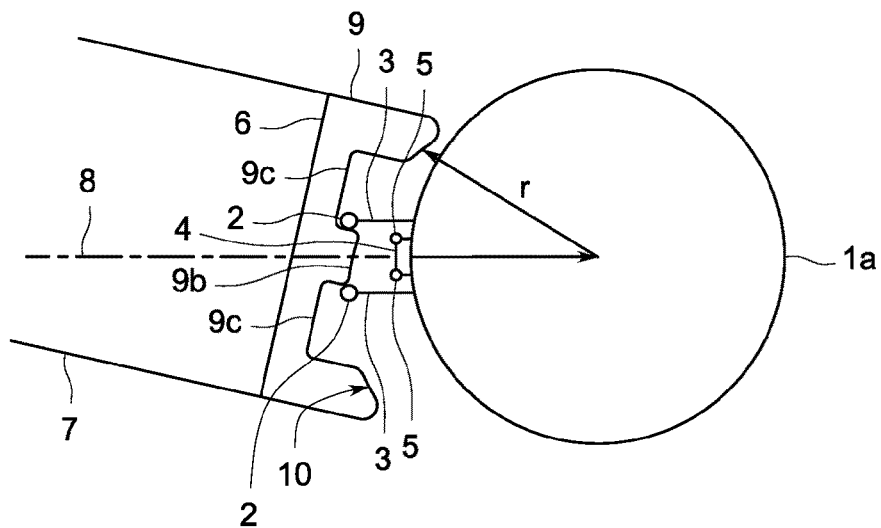
FIG. 4 is a view of the bow of the ship of FIG. 3 at an angle to a monopile with a conventional landing structure in the process of docking.
Figure 5:
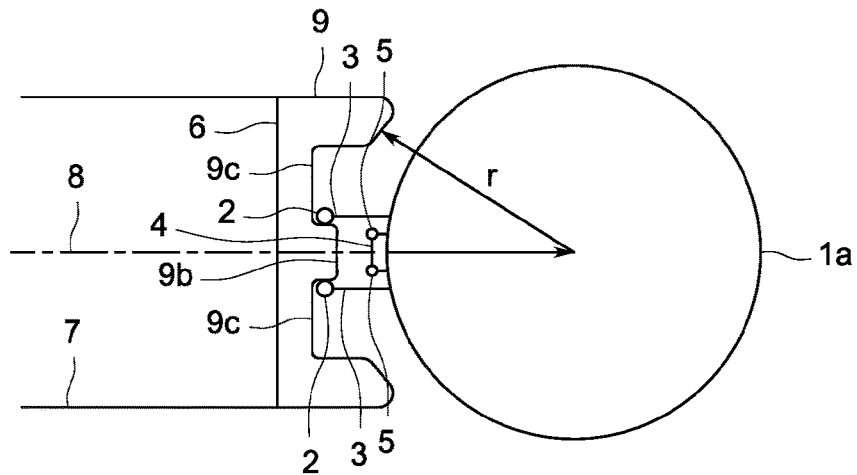
FIG. 5 is a view of the bow of the ship of FIG. 3 docked head on at a monopile with a conventional landing structure.

Turning first to FIG. 1, a structure such as an offshore monopile foundation of a wind turbine generator is shown in part. In accordance with the invention the monopile 1 is novel in the sense that it does not comprise the traditional landing structure, comprising two vertical protective columns 2 arranged on spacers 3 in front of a ladder, with rungs 4 and stingers 5, all arranged on the monopile 1, as illustrated in FIG. 4 and FIG. 5. The layout of the spacers 3 and/or the columns is so that in case of impact or excessive propulsion force from the ship during docking, they—rather than the monopile 1—will deform, hence protecting the latter. Also, frictional wear that might damage the protective coat of paint and expose steel to corrosive salt water, will be on the protective structure rather than on the monopile 1. Should the protective columns or other part of the landing structure be damaged, repair or replacement thereof will be of substantially lower costs than replacing the entire monopile 1.

Most often the monopile 1 comprises a transition piece between the pile or tube which has been rammed into the seabed and the tower of the wind turbine or whatever the monopile foundation serves. In the following, such transition pieces are considered part of the novel monopile 1, as they would in the prior art normally be the parts of the conventional monopile on which the protective structure is located.

Furthermore, in FIG. 1 the bow 6 of a ship 7 is illustrated. The ship 7 may be a single hull ship or multiple hull ship such as catamaran. The bow 6 of the ship is preferably not pointed in forward direction of the ship 7 as indicated by the arrow 8 but generally flat across that direction. Generally, ships are largely symmetrical at least regarding the hull or hulls, and the arrow 8 thus also defines a longitudinal centre line of the ship 7. A single fender 9 is arranged on the bow 6 of the ship 7. When not influenced by any significant external forces, i.e. when not pressed against anything by the ship 7, the fender has a generally concave shape 10 as seen from the forward direction 8. As can be seen, the concave shape 10 of the fender 9 generally has a curvature which is the shape of a circular sector, at least as seen in vertical projection. This circular sector may have a radius r corresponding to the radius of the monopile 1 against which it is most frequently going to dock, so as to ensure a large contact surface, allowing the fender to engage a large area of the monopile 1, and avoiding any points of high force, that may potentially damage the monopile 1, and compromise the structural integrity thereof, or exposing the steel by scratching the paint coating it. At the same time good friction is obtained between the fender 9, which typically comprises a high friction surface such as rubber, and the painted steel monopile 1. This friction allows the bow 6 of the ship 7 to be held steady against the monopile 1 under the pressure from the engines of the ship 7, provided that wind, waves and currents are not too excessive. It is to be understood that docking in this context is to be understand broadly and the process of holding the ship as steady as possible against the monopile 1 or other structure during transfer of equipment and/or personnel.

Figure 2:
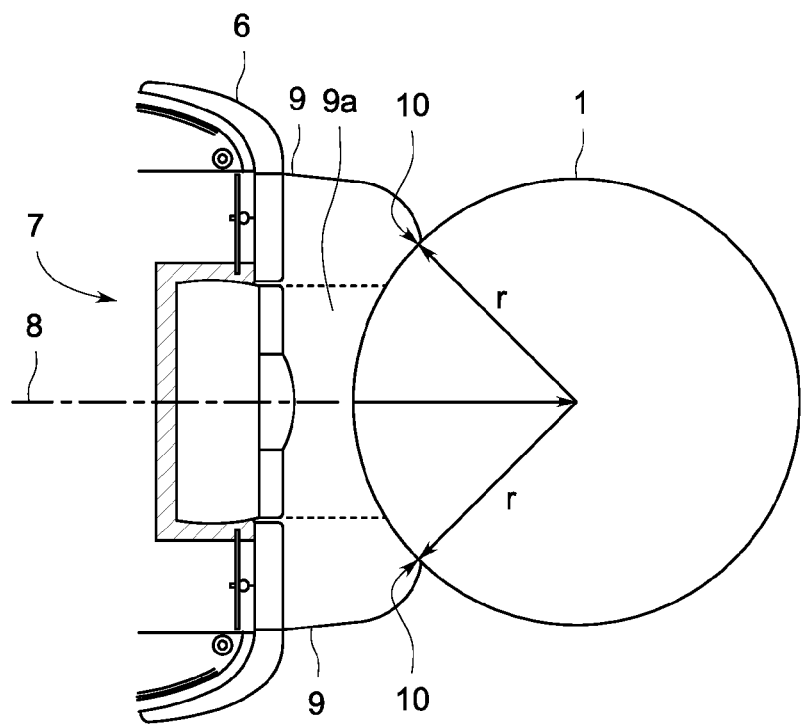
FIG. 2 is a view corresponding to that of FIG. 1 of the bow of a ship with multiple fenders according to the invention.

Turning now to FIG. 2 an alternative embodiment of a bow 6 of a ship 7 with three fenders 9, 9a is shown. As in FIG. 1 the monopile 1 is of the novel type without the protective columns 2 of the landing structure. There are two lateral fenders 9 each comprising a generally concave shape 10 as seen from the forward direction 8. All three have the preferred circle sector curvature with radius r matching the radius of the monopile 1. The central fender 9a may be retractable to allow for accommodation of the protective columns 2 and/or ladder of a conventional landing structure, should it be necessary for the ship 7 to dock at a prior art monopile 1. In one alternative, the central fender 9a may be depressable against a spring and/or damper system when pressed against the protective columns 2. In another alternative, the central fender 9a may be substantially softer than the lateral fenders 9, so as to be elastically deformed by the protective columns 2, when the lateral fenders 9 are pressed against the monopile 1 by the ship 7. Any of these three embodiments of the central fender 9a would also allow for good engagement, should the monopile 1 be a monopile 1 with a smaller radius than the one forming part of the system of monopile 1 and fender 9, 9a for which the radius r of the fender 9, 9a is conceived. Typically, the radii of monopiles 1 have only been increasing over the years, so backward compatibility in almost inherent if the radius r of the fender 9 is matched to last generation monopiles 1. Accordingly, to match current and future monopile radii and ensure backward compatibility the circular sector preferably has a radius of in the interval between 3 and 10 meters, preferably between 4 and 8 meters, and most preferred between 5 and 7 meters. However, smaller radii may also be employed, such as from 1 meter and upward, e.g. if the ship 7 according to the inventions is devised for docking against other structures than the monopile 1 used in the exemplary embodiments.

Figure 3:
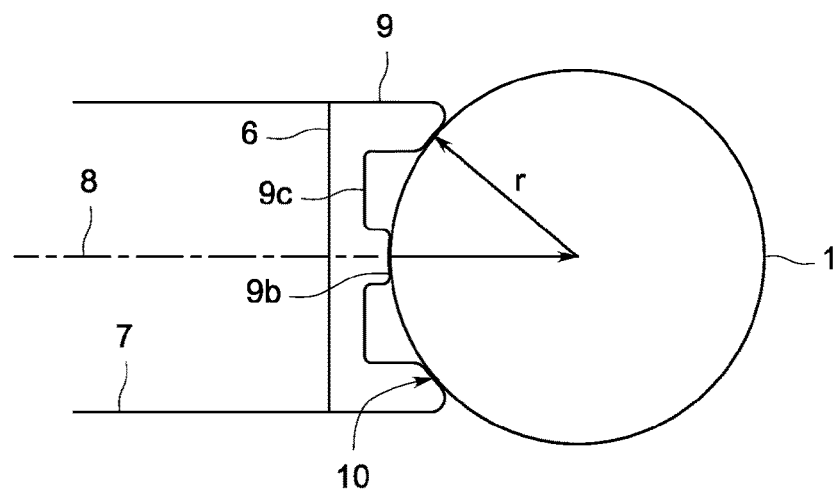
FIG. 3 is a view corresponding to that of claim 1 of the bow of ship with an alternative embodiment of a fender according to the invention.
Figure 6:
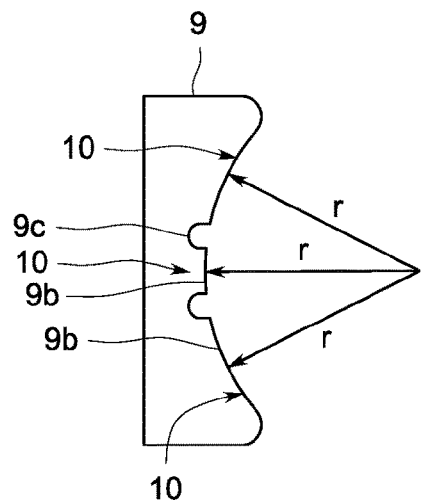
FIG. 6 is a schematic top view of an alternative shape of the fender of FIGS. 1 to 5.

As an alternative to the central fender part 9a described above a single fender 9 could comprise several sectors 9, 9a with the predetermined curvatures, such as illustrated in FIGS. 3 to 5 where lateral fender parts with radius r and a central fender part 9b are spaced with suitable recesses 9c. As can be seen from FIG. 3 the multiple curved fender parts will provide good engagement when docking directly against the novel monopile 1 without the landing structure, but at the same time allow the docking at a conventional monopile 1a with the protective columns 2 of the conventional landing structure as can be seen from FIGS. 4 and 5. As will be seen by comparison with FIG. 6 the recesses need not be as wide as in the embodiment illustrated in FIGS. 3 to 5, but may be narrower allowing more engagement surface for engaging the monopile 1. The curvature 10 may be the same, i.e. the radius r for all three engagement parts of the fender, the radii may of course also differ between the different fender sections or they may vary along the respective concave parts of the fender 9, 9b. The same applies to the other embodiments disclosed. That is to say the radii r may vary for each concave fender 9, 9a when the overall fender is made of several individual fenders 9, 9a.

Figure 7:
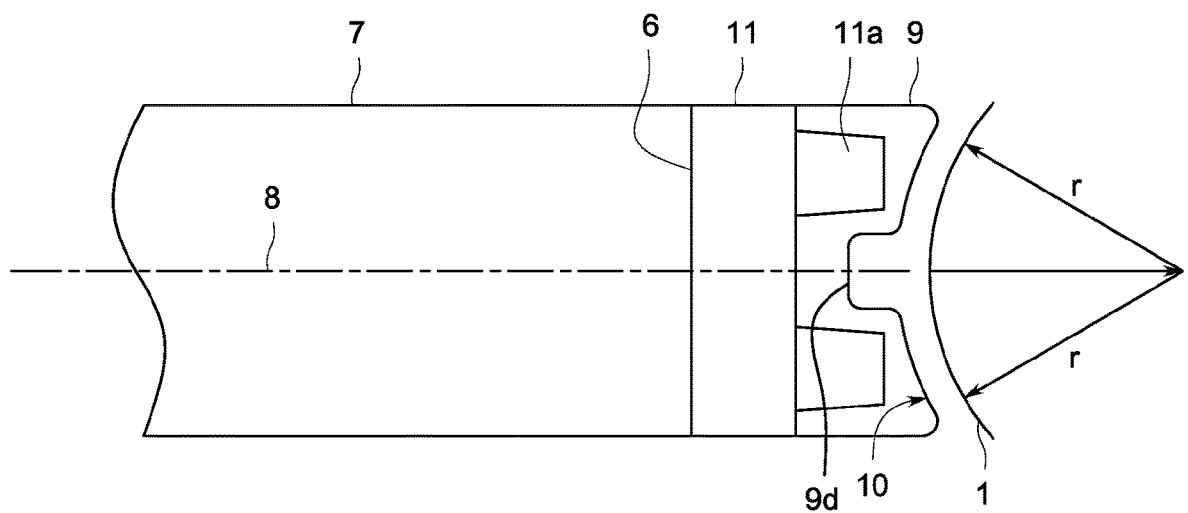
FIG. 7 is a schematic top view of the bow of as ship with a single fender and crush zones formed by plastically deformable members.

Turning now to FIG. 7, a further preferred embodiment of the ship 7 according to the invention is shown. The additional features of this embodiment as described below are all applicable to and may be implemented in the previously described embodiments, and vice versa. The ship 7 is shown at a short distance from the novel monopile 1, such as during approach for docking against the novel monopile 1. Though the monopile 1 shown is the novel monopile 1 without a landing structure with protective columns 2, it will be apparent for the skilled part that the recess 9d in the fender 9 allows for the accommodation of the conventional landing structure and hence docking against a conventional monopile 1a.

To further protect the delicate monopile 1 against impacts that might compromise the structural integrity of the monopile 1, and consequently the entire wind turbine generator, the ship may further be fitted with crush zones. The crush zones comprise plastically deformable members 11, 11a arranged between the bow 6 of the ship 7 and the fender 9. The construction of such plastically deformable members are known per se and the constructional details thereof are of minor importance to the invention. They could comprise metal honeycomb structures or similar cell or frame-like structures. In the embodiment shown, the crush zone comprises a plastically deformable member arranged between the bow 6 and the fender 9. If the impact or pressure from the ship 7 against the monopile 1 is too high to be absorbed by the elastically deformable fender 9, the plastically deformable member 11 will deform rather than the monopile 1. However, replacing or repairing the plastically deformable member may be carried out at next port call at minimal cost—at least as compared to the repair or replacement of an offshore monopile 1. Additionally, or as an alternative to the plastically deformable member 11, one or more plastically deformable members 11a could be arranged between the bow 6 of the ship 7 and the fender 9 by being accommodated in suitable recesses in the back of the fender 9, as seen from the forward direction 8. Systems of springs and dampers, such as described for the central part 9a above, could also be employed only with an elastically deformable fender, 9, 9a, 9b in front of it, as seen in the forward direction 8 of the ship 7.

The invention claimed is:

1. A ship, comprising:
at least one hull and a bow part defining a forward direction of said ship, where said bow part comprises at least one elastically deformable fender extending at least partially across said bow part with a given curvature in a cross-wise direction and having at least one curved engagement surface in said cross-wise direction, where said engagement surface faces in said forward direction and is adapted to engage a structure during docking of the ship at said structure;
wherein said fender comprises at least one concave engagement surface as seen in said cross-wise direction from said forward direction, where said concave engagement surface comprises a number of recesses adapted to accommodate a landing structure of said structure.

2. The ship of claim 1, wherein curvature of the concave engagement surface comprises at least one circular sector along the curvature.

3. The ship of claim 2, wherein the circular sector has a radius of more than about 1 meter.

4. The ship of claim 2, wherein the circular sector has a radius of about 1 meter to about 10 meters.

5. The ship of claim 2, wherein the circular sector has a radius of about 3 meters to about 10 meters.

6. The ship of claim 2, wherein the circular sector has a radius of about 4 meters to about 8 meters.

7. The ship of claim 2, wherein the circular sector has a radius of about 5 meters to about 7 meters.

8. The ship of claim 2, wherein the circular sector has a center point located ahead of the ship.

9. The ship of claim 8, wherein the center point is located straight ahead of the ship, coinciding with the forward direction of the ship.

10. The ship of claim 1, wherein the fender is elastically deformable, the ship further comprising at least one plastically deformable member arranged between the elastically deformable fender and the at least one hull.

11. The ship of claim 10, wherein the at least one plastically deformable member (11, 11a) is located in a recess in the back of the elastically deformable fender, as seen in the forward direction.

12. A method for docking a ship according to claim 1 against a structure, the ship having engine power, said method comprising:
pressing the ship against the structure using the engine power of the ship.

13. The method of claim 12, wherein the structure is an off-shore structure, and the off-shore structure is a monopile of a wind turbine.

14. The method of claim 13, wherein the monopile is without protective columns.

15. A system comprising a ship according to claim 1 and a monopile.

16. The system of claim 15, wherein the monopile is without protective columns.

* * * * *